United States Patent [19]

Lupton

[11] Patent Number: 4,729,092

[45] Date of Patent: Mar. 1, 1988

[54] TWO STORE DATA STORAGE APPARATUS HAVING A PREFETCH SYSTEM FOR THE SECOND STORE

[75] Inventor: John Lupton, Manchester, England

[73] Assignee: International Computers Limited, London, England

[21] Appl. No.: 735,257

[22] Filed: May 17, 1985

[30] Foreign Application Priority Data

Jun. 22, 1984 [GB] United Kingdom ............... 8416037

[51] Int. Cl.⁴ .................... G06F 12/00; G06F 9/26
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,956,738 | 5/1976 | Tessera | 364/200 |
| 4,080,648 | 3/1978 | Asano et al. | 364/200 |
| 4,156,905 | 5/1979 | Fassbender | 364/900 |
| 4,179,731 | 12/1979 | Yamazaki | 364/200 |
| 4,179,737 | 12/1979 | Kim | 364/200 |
| 4,292,674 | 9/1981 | Scheuneman | 364/200 |
| 4,371,924 | 2/1983 | Schaefer et al. | 364/200 |
| 4,373,180 | 2/1983 | Linde | 364/200 |
| 4,390,946 | 6/1983 | Lane | 364/200 |
| 4,439,827 | 3/1984 | Wilkes | 364/200 |

Primary Examiner—Raulfe B. Zache
Assistant Examiner—Florin Munteanu
Attorney, Agent, or Firm—Lee, Smith & Zickert

[57] ABSTRACT

Data storage apparatus comprises a main store, for example a microprogram store, with an associated address generating circuit. In order to extend the capacity of the store, an additional store is provided, but because of physical limitations this is remote from the main store. To reduce delays in accessing data items from the additional store, a prediction circuit predicts the address of the next item to be required from the additional store and prefetches it. A control circuit checks whether the prefetched item is the correct one and, if it is not, causes a temporary hold-up in the operation of the address generation circuit to allow the correct data item to be fetched.

6 Claims, 3 Drawing Figures

4,729,092

TWO STORE DATA STORAGE APPARATUS HAVING A PREFETCH SYSTEM FOR THE SECOND STORE

BACKGROUND OF THE INVENTION

This invention relates to data storage apparatus and is particularly, although not exclusively, concerned with storage apparatus for microprogram data (i.e. sequences of microinstructions).

It is often required to read a series of data items (e.g. microinstructions) in rapid succession. This implies, among other things, that the circuits for generating addresses for the data store should be positioned in close physical proximity to the store, so as to reduce the effects of propagation delays. It may, for example, be possible to locate the address generating circuits on the same printed circuit board as the store. However, if it is desired to extend the store, it may not be physically possible to put an additional store on the same circuit board. The additional store must therefore be located on another circuit board remote from the first store and the address generating circuit, and as a result the access time for the additional store is increased.

The object of the present invention is to alleviate this problem.

SUMMARY OF THE INVENTION

The invention provides data storage apparatus comprising:

(a) a main store, (b) an additional store remote from the main store, (c) an address generating circuit adjacent to the main store, for producing a series of addresses indicating the locations of required data items either in the main store or in the additional store, the addresses being fed directly to the address input of the main store, (d) a prediction circuit for predicting the address of the next data item to be required from the additional store, and prefetching that data item, and (e) a control circuit for detecting situations in which the required data item, as specified by the address from the address generating circuit, is in the additional store but is not the predicted data item which has been prefetched from the additional store and, upon detecting such a situation, producing a temporary hold-up in the address generation circuit while the additional store is accessed using the address from the address generating circuit, so as to read out the correct data item.

It can be seen that data items are normally fetched in advance from the additional store so that they are available without any delay. Thus, the access time of the additional store can be effectively the same as that of the main store. If the address prediction is not correct, a delay has to be introduced, but it is assumed that the prediction will be correct for the majority of accesses to the additional store.

If the data items are normally addressed consecutively (as is generally the case of microinstructions, for example) then the prediction circuit may comprise an incrementer circuit which adds one to the previous address to produce the predicted address.

BRIEF DESCRIPTION OF THE DRAWINGS

One storage apparatus in accordance with the invention will now be described by way of example with reference to the accompanying drawings.

DESCRIPTION OF AN EMBODIMENT OF THE INVENTION

Figure 1:
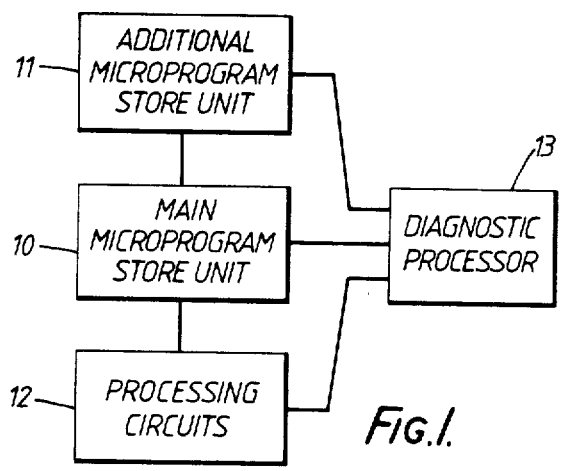
FIG. 1 is a block diagram of a data processor including a microprogram store in accordance with the invention.

Referring to FIG. 1, this shows a data processing unit comprising a main microprogram store unit 10, and an additional microprogram store unit 11, remote from the unit 10. For example, the units 10,11 may be located on separate printed circuit boards.

As will be described in more detail later, microinstructions are addressed by a 16-bit microprogram address MPA. This address can take values in the range 0 to 64K−1 (where 1K=1024). The main microprogram store unit 10 holds microinstructions with addresses in the range 0 to 16K−1, while the additional microprogram store unit holds microinstructions in the address range 16K to 32K−1. The remaining part of the address range is not used in this particular embodiment, although in other embodiments of the invention it may be used to address further microprogram stores. It can be seen that the two most significant bits of the address indicate which unit is to be accessed: 00 indicates the main microprogram store unit and 01 indicates the additional microprogram store unit, while 10 and 11 are not used.

The microprogram store units supply microinstructions to processing circuits 12, to control their operation. The system also includes a diagnostic processor 13 which has access to both the microprogram store units and the processing circuits. The processing circuits 12 and the diagnostic processor 13 may be conventional and form no part of the present invention, and so they will not be described further.

Main microprogram store unit

Figure 2:
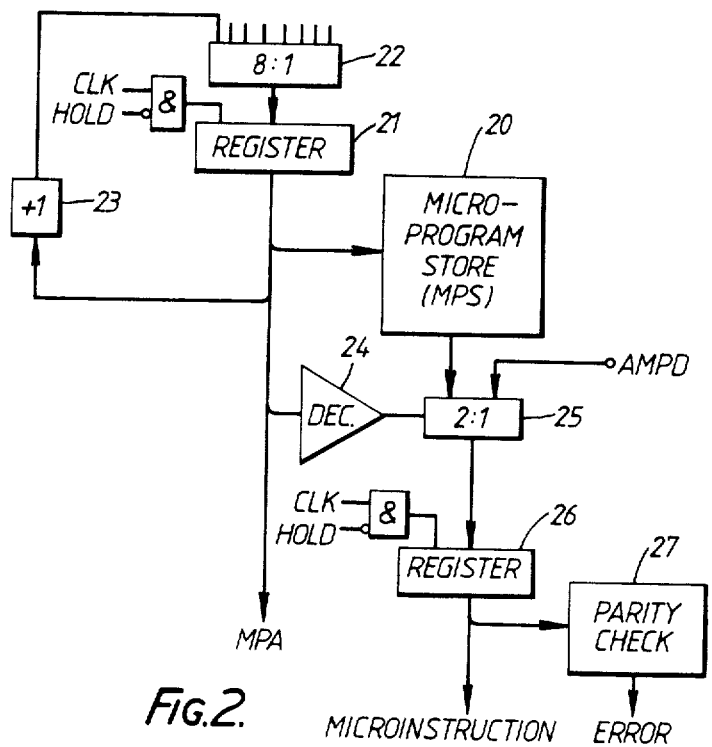
FIG. 2 shows a main microprogram store unit in detail.

Referring to FIG. 2, the main microprogram store unit 10 includes a microprogram store (MPS) 20 having 16K locations, each of which holds a 40-bit microinstruction, along with parity bits and an invert bit for detecting and correcting errors in the store.

The unit 10 also includes an address generating circuit, comprising a microprogram address register 21, an 8:1 multiplexer 22, and an incrementer circuit 23. The register 21 holds the current microprogram address MPA, and is clocked at every beat of a clock signal CLK unless a HOLD signal is present. Thus, the register 21 is normally loaded with a new microprogram address at each clock beat. This new address comes from the multiplexer 22 which selects one of eight sources. Normally, the selected source is the incrementer 23, which adds one to the current value of MPA. The other sources provide jump addresses, and are selected when a jump microinstruction is obeyed, or when a new microinstruction sequence is initiated.

As indicated above, the two most significant bits of the microprogram address MPA specify which unit the required microinstruction is held in, and the 14 least significant bits indicate the location of the microinstruction within the specified unit.

The 14 least significant bits of MPA are fed directly to the address input of the MPS 20, so as to read out the corresponding microinstruction. The two most significant bits are decoded by a decoder circuit 24 to produce a control signal for a 2:1 multiplexer 25. When the two most significant bits are 00, the multiplexer 25 selects the output of the MPS 20, and when these bits are 01, it selects an output AMPD from the additional microprogram store unit 11.

The output of the multiplexer 25 is gated into a microinstruction register 26 at every beat of the clock signal CLK, unless the HOLD signal is present. The contents of this register 26 represent the current microinstruction, and are decoded in the conventional manner to produce the necessary control signals for the processing circuits 12. The contents of the register 26 are also checked by a parity checking circuit 27 which sends an ERROR signal to the diagnostic processor 13 if it detects a parity error.

Additional microprogram store unit

Figure 3:
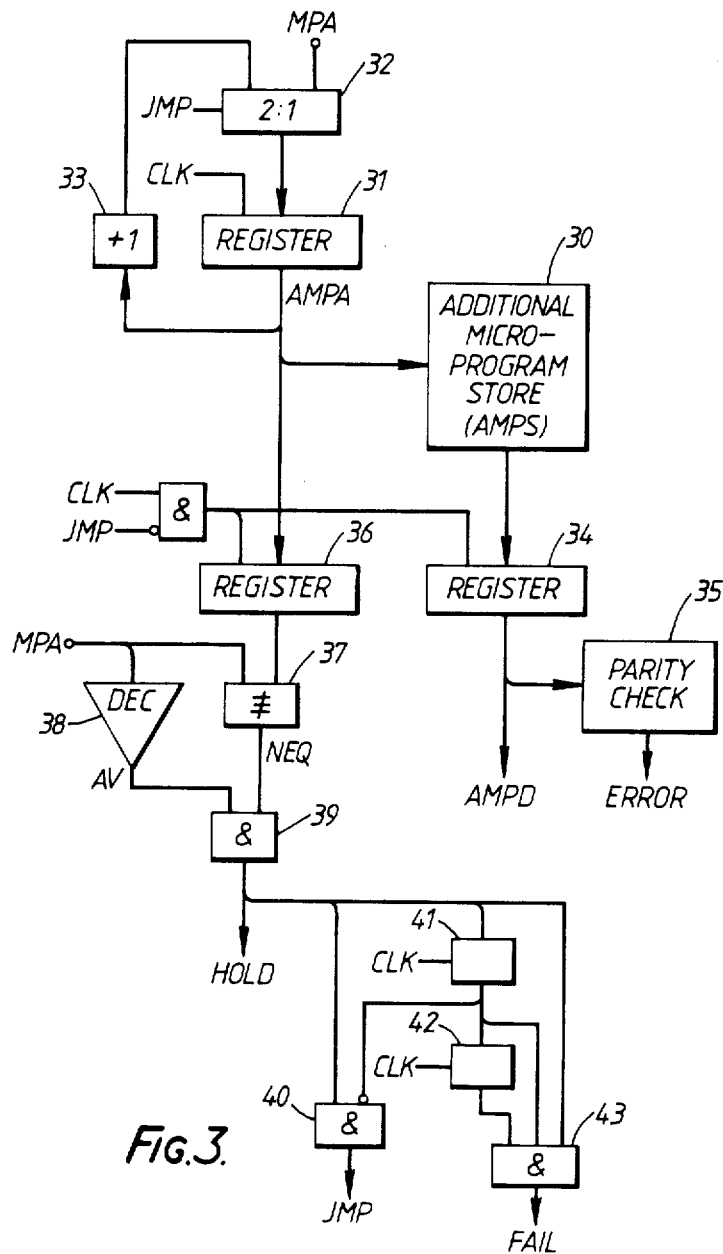
FIG. 3 shows an additional microprogram store unit in detail.

Referring to FIG. 3, the additional microprogram store unit 11 includes an additional microprogram store (AMPS) 30 similar to the MPS 20. The AMPS is addressed by a 14-bit address AMPA from a register 31.

The register 31 is loaded with a new address at each beat of the clock CLK. The new address is selected by a 2:1 multiplexer 32 and normally comes from an incrementer 33 which adds one to the current value of AMPA. Thus, the register 31, and incrementer 33 constitute an address prediction circuit which attempts to predict the address of the next microinstruction required from the AMPS, on the assumption that the microinstructions are normally addressed consecutively. However, when a control signal JMP is present, the multiplexer 32 selects its other input, which receives the current value of MPA from the register 21 in the main microprogram store unit.

The output from the AMPS is gated into a register 34 at each beat of the clock CLK, unless the JMP signal is present. The contents of this register represent a predicted microinstruction which has been prefetched from the AMPS, and provide the output AMPD which is fed to the multiplexer 25 in the main microprogram store unit as described above. The contents of the register 34 are also checked by means of a parity checking circuit 35.

Whenever a predicted microinstruction is loaded into the register 34, the address which was used to access that microinstruction is gated from the register 31 into a register 36. The contents of the register 36 are continuously compared, by means of a comparator 37, with the 14 least significant bits of the actual microprogram address MPA from the main microprogram store unit, to produce a signal NEQ if they are not equal.

The two most significant bits of MPA are decoded in a decoder 38 to produce a signal AV which is true if these bits have the value 01, indicating that the required microinstruction is in the AMPS. The signals NEQ and AV are combined in an AND gate 39, to produce the control signal HOLD. Thus, it can be seen that HOLD is true if the required microinstruction is in the AMPS, but is not the predicted microinstruction which has just been fetched into the register 34.

As mentioned above, the HOLD signal prevents the registers 21 and 26 from being loaded. It is also fed to the processing circuits 12 to hold up their operation, so as to prevent the previous microinstruction from being re-executed. The HOLD signal also enables an AND gate 40, causing it to produce the control signal JMP described above. At the first beat following the HOLD signal, a bistable 41 is set, and this disables the AND gate 40, removing the JMP signal. Thus, JMP persists for just the first beat of the HOLD signal. At the next clock beat, the output of bistable 41 sets another bistable 42. The outputs of the two bistables 41,42 are combined in an AND gate 43 with the HOLD signal to produce a signal FAIL if HOLD persists for more than two clock beats.

Operation

In operation, while the address MPA is in the range 0 to 16K−1 the multiplexer 25 selects the output of the MPS 20. Hence, one microinstruction is read from the MPS 20 at each clock beat, and the output of the AMPS 30 is ignored. Also, the signal AV is false, and so the AND gate 39 is disabled, preventing the HOLD signal from being produced.

Suppose now that a jump occurs which takes the address MPA into the range of the AMPS (i.e. 16K to 32K−1). This makes AV true. At the same time, NEQ will be true, unless by chance the contents of the register 36 happen to be equal to the jump address. Thus, the AND gate 39 is enabled, producing the HOLD signal. This freezes the operation of the main microprogram store unit 10 and the processing circuits 12, and produces the JMP signal which switches the multiplexer 32 so as to select the jump address (MPA).

At the first clock beat after the HOLD, the jump address (MPA) is loaded into the register 31. This register then addresses the AMPS 30 so as to read out the required microinstruction. Also at this beat, the JMP signal is removed, switching the multiplexer 32 back to select the output of the incrementer 33.

At the next clock beat, the microinstruction is gated into register 34 and the jump address in register 31 is gated into register 36. At the same time, the jump address plus one is gated into the register 31 from the incrementer circuit 33, to provide the predicted next address. Since register 36 now holds the jump address, the comparator 37 detects equality and NEQ becomes false. This disables the AND gate 39 and removes the HOLD signal.

At the next clock beat the microinstruction in register 34 is gated into the register 26 by way of the multiplexer 25, and becomes the active microinstruction. At the same time, the predicted next microinstruction is gated into the register 34 from the AMPS, and the predicted address of the next again microinstruction is formed by the address prediction circuit (31,32,33).

Thus, it can be seen that a jump into AMPS introduces a two-beat hold-up in the flow of microinstructions. (If the hold up persists for more than two beats, this must indicate a failure, and is detected by the AND gate 43 as described above). During the subsequent operation, for as long as there are no jumps in the microprogram address sequence, the register 31 will correctly predict the next microprogram address, allowing the next microinstruction to be prefetched from the AMPS. The prefetched micro- instruction is available from the AMPS sufficiently early to be gated into the register 26 at the first clock beat following the appearance of its address in the register 21. Hence, there is no delay in fetching microinstructions from the AMPS compared with fetching them from the MPS.

If a jump occurs within the AMPS, it is detected in the same way as a jump into the AMPS, and again causes a two-beat hold-up while the correct microinstruction is loaded into the register 26.

When a jump back into the MPS occurs, the multiplexer 25 is immediately switched back to select the output of the MPS, and so operation can continue without any hold-up.

Parity failure

When a parity failure is detected by the parity checking circuit 27, the erroneous microinstruction is already in the register 26. Hence, it may already have been decoded and caused some unwanted actions. The microinstruction sequence must therefore be rolled back to some previously preserved state (e.g. the start of a high-level instruction) and then re-started after correction of the error. This is a known procedure and so need not be described herein.

However, the microinstructions from the AMPS are prefetched into the register 34 before they are loaded into the register 26. Hence, the parity checking circuit 35 detects errors in these microinstructions before they can have any unwanted effects. Thus, if a parity failure is detected by the circuit 35, the diagnostic processor 13 can simply freeze the operation of the system while it corrects the error (e.g. by re-writing the contents of the currently addressed location of the AMPS) and then re-start the operation from the point where it was halted. In other words, errors in the AMPS can be corrected in line, without the need to roll back the microprogram sequence.

Preferably, the AMPS has two modes of operation: a normal mode, and a self-test mode, selectable by the diagnostic processor. In the normal mode the signal AV is fed to the registers 31,34,36 so as to freeze their contents whenever AV is not true (i.e. when the AMPS is not in use). In the self-test mode the registers are not frozen by AV, so that the address generating circuit of the AMPS continues to cycle sequentially through all 64K possible addresses when the AMPS is not selected. This allows the contents of the AMPS to be continously parity checked even when it is not in use.

It should also be noted that the MPS and AMPS form a single continuous address space from 0 up to 32K−1, and the processing circuits 12 are not aware of the source of any given microinstruction appearing in the register 26. Thus, microprogram sequences can be held anywhere in this address space as convenient.

However, as described above, there is a two-beat hold-up whenever a jump is made into or within the AMPS. Hence, the AMPS is preferably used for holding less frequently used microprogram sequences, or long sequences with no jumps. Also, because of the possibility of in-line error correction, the AMPS may be used to hold sequences for which roll-back would be undesirable or impossible.

What is claimed is:

1. Data storage apparatus comprising:

(a) a main store having an address input and a data output,
    (b) first address generating means for generating a first address signal,
    (c) means for applying the first address signal to the address input of the main store thereby reading out a data item from the data output of the main store,
    (d) an additional store having an address input and a data output,
    (e) second address generating means responsive to a previously generated first address signal for generating a second address signal, predicting said first address signal,
    (f) means for applying said second address signal to the address input of the additional store thereby reading out a data item from the data output of the additional store,
    (g) selection means connected to the data outputs of the main store and the additional store and responsive to the first address signal, for selecting the data item read out from the data output of the main store when the first address is in a first predetermined range and selecting the data item read out from the data output of the additional store when the first address is in a second predetermined range,
    (h) comparison means for comparing said first and second address signals and, if they are unequal, producing an inequality signal, and
    (i) means connected to the second address generating means and responsive to said inequality signal, for setting the second address signal equal to the first address signal.

2. Apparatus according to claim 1 further including means responsive to said inequality signal for producing a temporary hold-up in the first address generating means, while said inequality signal is present.

3. Apparatus according to claim 1 further including a data buffer register connected between the data output of the additional store and the selection means, and an address buffer register connected between the second address generating means and the comparison means.

4. Apparatus according to claim 3 further including checking means connected to the data buffer register for parity checking a data item in that register.

5. Apparatus according to claim 1 including a first and second printed circuit boards, wherein the main store, the first address generating means, and the selection means are constructed on the first printed circuit board, and the additional store, the second address generating means, and the comparison means are constructed on the second printed circuit board.

6. Apparatus according to claim 1 wherein the data items in said main store and said additional store are microprogram instructions.

* * * * *